United States Patent [19]

Sudhakar et al.

[11] Patent Number: 5,423,976
[45] Date of Patent: Jun. 13, 1995

[54] HYDROTREATING OF CRACKED NAPHTHA

[75] Inventors: Chakka Sudhakar, Wappingers Falls; Gerald G. Sandford, Glenham; Phillip L. Dahlstrom; Mahendra S. Patel, both of Hopewell Junction; Edwin L. Patmore, Fishkill, all of N.Y.

[73] Assignee: Texaco Inc., White Plains, N.Y.

[21] Appl. No.: 209,492

[22] Filed: Mar. 14, 1994

Related U.S. Application Data

[63] Continuation of Ser. No. 919,318, Jul. 27, 1992, abandoned.

[51] Int. Cl.$^6$ .................... C10G 45/60; C10G 45/04; C10G 45/08
[52] U.S. Cl. ..................... 208/216 R; 208/215; 208/213; 208/217
[58] Field of Search ................. 208/216 R, 217, 213, 208/215

[56] References Cited

U.S. PATENT DOCUMENTS

| | | | |
|---|---|---|---|
| 2,608,521 | 8/1952 | Hoog | 208/213 |
| 2,749,282 | 6/1956 | Porter et al. | 208/216 R |
| 2,983,669 | 5/1961 | Noll | 208/97 |
| 3,112,257 | 11/1963 | Douwes et al. | 208/216 R |
| 3,594,312 | 7/1971 | Christman et al. | 208/216 R |
| 3,836,453 | 9/1974 | Kovach et al. | 208/216 R |
| 3,893,944 | 7/1975 | Mertzweiller et al. | 208/143 |
| 4,132,632 | 1/1979 | Yu et al. | 208/216 R |
| 4,140,626 | 2/1979 | Bertolacini et al. | 208/216 R |
| 5,051,389 | 9/1991 | Lang et al. | 208/216 R |
| 5,340,466 | 8/1994 | Dai et al. | 208/216 PP |

*Primary Examiner*—Paul Lieberman
*Assistant Examiner*—Patricia L. Hailey
*Attorney, Agent, or Firm*—Kenneth R. Priem; Cynthia L. Kendrick

[57] ABSTRACT

Hydrodesulfurization of cracked naphtha, with minimum attendant hydrogenation of olefins, is effected over a sulfided carbon support catalyst bearing (i) a non-noble Group VIII metal, (ii) a Group VI-B metal, and (iii) a metal of Group IA, II A, III B, or the lanthanide Group of rare earths.

8 Claims, No Drawings

HYDROTREATING OF CRACKED NAPHTHA

This application is a continuation of U.S. patent application Ser. No. 07/919,318, filed Jul. 27, 1992, now abandoned.

FIELD OF THE INVENTION

This invention relates to hydrotreating of cracked naphtha. More particularly it relates to a process for selectively deep hydrodesulfurizing a cracked naphtha under conditions to minimize saturation of the olefin content and to a selectively poisoned hydrodesulfurization catalyst.

BACKGROUND OF THE INVENTION

As is well known to those skilled in the art, coking or fluid catalytic cracking (FCC) produce a cracked naphtha. This stream is one of the blending components to the gasoline pool; and it may typically be as much as 35–40% of the total gasoline pool. Cracked naphtha typically contains sulfur in amount of as much as 1000–4000 wppm; and this stream is typically a major contributor of sulfur to the gasoline pool—the other 60–65% of the pool typically contains much lower quantities of sulfur.

Cracked naphtha (including coker naphtha) typically also contains a significant concentration of olefins which desirably contribute to the octane number of the gasoline pool.

Conventional processes which attempt to hydrodesulfurize cracked naphtha charge are found typically to undesirably effect hydrogenation of the olefin components of the charge.

Typical prior art processes for hydrodesulfurizing charge cracked naphtha include those disclosed in U.S. Pat. No. 4,132,632 to Yu et al and U.S. Pat. No. 4,140,626 to Bertolacini et al—both assigned to Standard Oil Company (Indiana).

These patents disclose a hydrodesulfurization process wherein the catalyst contains VI-B and VIII metals on a support which is at least 70 w % magnesium oxide and which may also contain other refractory inorganic oxides such as alumina, silica, or silica/alumina.

It is an object of this invention to provide a novel catalyst and process for hydrotreating a charge cracked naphtha. Other objects will be apparent to those skilled in the art.

STATEMENT OF THE INVENTION

In accordance with certain of its aspects this invention is directed to a process for treating a charge cracked naphtha containing olefinic components and undesired sulfur which comprises maintaining a bed of sulfided carbon supported catalyst containing (i) a metal of non-noble Group VIII, (ii) a metal of Group VI-B, and (iii) a metal of Group IA, IIA, IIIB, or a lanthanide;

passing a charge cracked naphtha containing olefinic components and undesired sulfur into contact with said catalyst;

maintaining said charge cracked naphtha containing olefinic components and undesired sulfur in contact with said catalyst at hydrodesulfurizing conditions thereby effecting hydrodesulfurization of said charge cracked naphtha containing olefinic components and undesired sulfur and forming a product stream of cracked naphtha containing a decreased content of sulfur; and recovering said product stream of cracked naphtha containing a decreased content of sulfur.

DESCRIPTION OF THE INVENTION

The charge hydrocarbon which may be treated by the process of this invention may include those which are commonly designated as cracked naphthas and include light naphtha, a full range naphtha, heavy naphtha, etc. These hydrocarbons are typically recovered from cracking or coking operations and are to be passed to the gasoline pool.

These charge hydrocarbons may be commonly characterized by the following properties:

TABLE

| Property | Broad Range | Typical Charge A | Typical Charge B |
|---|---|---|---|
| API Gravity | 40–100 | 58.2 | 58 |
| Boiling Range °F. | 60–550 | 92–438 | 92–432 |
| ibp | 60–300 | 92 | 92 |
| 10% | 80–320 | 129 | 137 |
| 50% | 120–350 | 211 | 219 |
| 90% | 200–500 | 351 | 368 |
| ep | 300–550 | 438 | 432 |
| Nitrogen wppm | 0–500 | 20 | 20 |
| Octane No | | | |
| Unleaded MON | 40–100 | 80.5 | 80.5 |
| Unleaded RON | 40–120 | 93 | 93 |
| FIA Vol % | | | |
| Olefins | 5–60 | 35 | 28.5 |
| Aromatics | 0–50 | 27 | 29 |
| Sulfur wppm | 200–5000 | 1190 | 1410 |

In practice of the process of this invention, the charge cracked naphtha is admitted to the catalyst bed and maintained therein at the following conditions:

TABLE

| Condition | Broad Range | Preferred Range | Typical |
|---|---|---|---|
| Temp | | | |
| °F. | 212–842 | 482–752 | 608 |
| °C. | 100–450 | 250–400 | 320 |
| Pressure | | | |
| Psig | 50–1500 | 250–1000 | 400 |
| bar | 3.4–100 | 17–68 | 28 |
| Hydrogen Flow SCFB | 50–5000 | 100–2000 | 500 |
| LHSV | 0.1–10 | 0.5–5 | 2 |

The supported catalyst of this invention is prepared on an activated carbon support. Although it may be possible to utilize powdered carbon in a fluidized bed, it is preferred to utilize extrudates in a packed bed. The support maybe in the form of granules, pellets, or extrudates of carbon which may contain a refractory inorganic oxide. Typical carbons which may be employed may possess the following characteristics:

TABLE

| Property | Broad Range | Preferred Range | Typical |
|---|---|---|---|
| Surface Area M$^2$/g BET | 200–2000 | 400–1800 | 1100 |
| Total Pore Vol TPV (for N$_2$) cc/g | 0.2–1.5 | 0.4–1.2 | 0.52 |
| Average Pore Diameter Å by N$_2$ physisorption | 8–200 | 8–50 | 19 |
| Apparent Bulk Density g/l | 200–800 | 300–600 | 475 |

TABLE-continued

| Property | Broad Range | Preferred Range | Typical |
| --- | --- | --- | --- |
| Ash Content w % | 0.01–25 | 0.1–15 | 9 |

Illustrative commercially available carbon pellets, granules, or extrudates which may be used as catalyst supports in fixed beds in practice of the process of this invention may include:

TABLE

A. 3 mm. (or 0.8 mm) extrudate of RX Series brand (of Norit Company) activated carbon: BET Surface Area 1400 m$^2$/g; Total Pore Volume 0.8 cc/g; Average Pore Diameter 22.4 Angstroms; Apparent Bulk Density 410 g/l; Ash Content 4.0 w %; 2.9 mm (or 0.8 mm) particle diameter.

B. 0.8 mm extrudate of RO Series brand (of Norit Company) activated carbon: BET Surface Area 1510 m$^2$/g; Total Pore Volume 0.98 cc/g; Average Pore Diameter 25.9 Angstroms; Apparent Bulk Density 400 g/l; Ash Content 6.0 w %; 0.8 mm particle diameter.

C. 1.4 mm extrudate of RO Series brand (of Norit Company) activated carbon; BET Surface Area 1100 m$^2$/g; Total Pore Volume 0.52 cc/g; Average Pore Diameter 19 Angstroms; Apparent Bulk Density 475 g/l; Ash Content 9.0 w %; 1.4 mm particle diameter.

It is a particular feature of the carbon supports which may be used in practice of one aspect of the process of this invention that they contain at least 0.01 w %, typically 0.01–20 w %, preferably 0.1–15 w %, say about 2 w % for potassium and 5% for La of a metal of Group I-A or II-A (the alkali metals or the alkaline earth metals) or of Group IIIB or a metal of the lanthanide series of atomic number 57–71. When the metal is an alkali metal, it may be sodium Na, potassium K, lithium Li, Cesium Cs, or Rubidium Rb—preferably potassium K. When the metal is an alkaline earth metal, it may be Magnesium Mg, Barium Ba, Calcium Ca, or Strontium Sr, —preferably Calcium Ca. When the metal is a lanthanide, it may typically be La, Ce, Pr, Nd, Pm, Sm, Eu, Gd, Tb, Dy, Ho, Er, Tm, Yb or Lu—preferably Lanthanum La. Group IIIB metals preferably include Sc and Y. When the charge carbon support does not contain any of these metals, they can be incorporated at any stage of the catalyst preporation.

The carbon support may contain more than one metal of each Group or it may contain metals from each of the Groups. The metal is typically added as a salt e.g. sodium acetate, calcium carbonate, $K_2SO_4$, La $(NO_3)_3$ or $YCl_3$; and it may be added dry or in the form of a solution or suspension. The carbon which is employed may typically contain some of the metals e.g. alkali metals such as Na or K.

The metal may be loaded onto the carbon support when the latter is being prepared—i.e. admixed with the carbon and the other components prior to extrusion or casting. More preferably however it is added by deposition onto the carbon pellet or granule from aqueous or non-aqueous solutions by equilibrium adsorption, incipient wetness impregnation, etc. Typically the carbon pellet may be impregnated to incipient wetness with an aqueous solution containing e.g. sodium acetate, potassium acetate, calcium acetate, etc. and heated in air to temperature of 100° C.–300° C.

The so-loaded carbon may then be further treated to deposit the remaining catalytic metals on the carbon, either sequentially or simultaneously, by various processes including incipient wetness impregnation, equilibrium adsorption, etc from aqueous or non-aqueous media.

The Group VI-B metal may be tungsten or more preferably molybdenum—present in the final catalyst in amount of 0.1–40 w %, preferably 0.5–30 w % say 6 w % for Mo and preferably 15 w % for W.

The non-noble Group VIII metal may preferably be nickel Ni or more preferably cobalt Co—present in the final catalyst in amount of 0.1–15 w %, preferably 0.1–10 w % say 2 w %

The Group VI-B metal may be loaded onto the catalyst support from a preferably aqueous solution of ammonium heptamolybdate or of ammonium metatungstate. The Group VIII metal may be loaded onto the catalyst support from a preferably aqueous solution of nickel nitrate or of cobalt nitrate.

It is preferred to deposit the Group VI-B metal first and thereafter the Group VIII metal with a drying and preferably a calcining step in between.

In a preferred embodiment, the carbon support is contacted with an aqueous solution of potassium acetate in amount sufficient to fill the pores to incipient wetness. The so-treated support is dried at 20° C.–150° C., say 115° C. for 16–24 hours, say 20 hours followed by calcination in air or inert atmosphere at 250° C.–450° C., say 300° C., for 2–6 hours, say 3 hours. Product carbon contains 2 w % of K.

Thereafter the carbon support is contacted with an aqueous solution of Group VI-B metal e.g. ammonium heptamolybdate tetrahydrate in amount sufficient to fill the pores to incipient wetness. The support is then dried at 20° C.–150° C., say 115° C. for 16–24 hours, say 20 hours followed by calcination at 250° C.–450° C., say 300° C. for 2–6 hours, say 3 hours.

Thereafter the carbon support is contacted with an aqueous solution of Group VIII metal e.g. cobalt nitrate hexahydrate in amount sufficient to fill the pores to incipient wetness. The support bearing the Group VI-B metal and the Group VIII metal is dried at 20° C.–150° C., say 115° C. for 16–24 hours, say 20 hours, followed by calcination at 250° C.–450° C., say 300° C. for 2–6 hours, say 3 hours.

The carbon—supported catalyst so prepared contains the following (w % as metal)

TABLE

| Component | Broad | Narrow | Typical |
| --- | --- | --- | --- |
| Group I-A/II-A/III-B/ Lanthanide | 0.01–20 | 0.01–15 | 2(K) or 5 (La) |
| Group VI-B | 0.1–40 | 0.5–30 | 6 Mo |
| Group VIII | 0.1–15 | 0.1–10 | 2 Co |

The so-prepared catalyst may then be sulfided, preferably after loading into the hydrodesulfurization reactor. Sulfiding may typically be effected by passing hydrogen sulfide, carbon disulfide, dimethyl sulfide, etc. along with hydrogen through the bed at 350° F.–850° F., say 670° F. and 0–1000 psig, say 0 psig for 2–24 hours, say 3 hours. Alternatively sulfiding may be carried out prior to loading the catalyst into the reactor. When the charge hydrocarbon contains more than about 0.1 w % sulfur, presulfiding of the catalyst may not be necessary.

During treatment of the charge hydrocarbon in practice of the one-step process of this invention, it is found that the sulfur content of the charge may be decreased from an initial value of 1200–1800 wppm, say 1200 wppm down to a final value of 50–400 wppm, say 175 wppm.

It is a particular feature of the process of this invention that the olefin content of the charge hydrocarbon is saturated only to a slight degree. Typically the olefin content of the charge (i.e. 10–50 v %, say 35 v %) is decreased to 8.8–26 v %, say 26 v %.

DESCRIPTION OF PREFERRED EMBODIMENTS

Practice of the process of this invention will be apparent to those skilled in the art from the following wherein all parts are parts by weight unless otherwise stated. An asterisk (,) indicates a control example.

EXAMPLE I*

In this Control Example, the catalyst which is the commercially available HDS-22 hydrodesulfurization catalyst containing phosphorus, molybdenum (10.3 w %), and cobalt (3.5 w %)—1/25 inch extrudates.

EXAMPLE II*

In this Control Example, the catalyst is the commercially available C-444 catalyst containing molybdenum (9.59 w %) and cobalt (3.22 w %).

EXAMPLE III*

In this Control Example, the catalyst is the commercially available HDS-1443B catalyst containing molybdenum ( 8.8 w % ) and nickel ( 2.3 w % ).

EXAMPLE IV*

In this Control Example, the catalyst is prepared by impregnating to incipient wetness 40 parts of Carbon A of the Table supra (of American Norit Company) in the form of 20–40 mesh particles with 25 parts of deionized water containing 5 parts of AHM Ammonium heptamolybdate.$4H_2O$. After heating in air at 115° C. for 24 hours and cooling to ambient temperature, the material is impregnated to incipient wetness by contact with 23.5 parts of deionized water containing 4.5 parts of nickel nitrate.$6H_2O$. The resulting material is heated in air at 115° C. for 24 hours. The final catalyst contains molybdenum as partially decomposed ammonium heptamolybdate and nickel as partially decomposed nickel nitrate. Metal content of the final catalyst is 6 w % Mo and 2 w % Ni.

EXAMPLES V*

In this Control Example, the catalyst is prepared by impregnating to incipient wetness 39.3 parts Carbon A of the Table supra (of American Norit Company) in the form of 0.8 mm extrudates with 29 parts of deionized water containing 9.2 parts of ammonium heptamolybdate.$4H_2O$. After heating in air at 115° C. for 24 hours and cooling to ambient temperature, the material is impregnated to incipient wetness by contact with 27 parts of deionized water containing 8.7 parts of cobalt nitrate.$6H_2O$. The resulting material is heated in air at 115° C. for 24 hours. The final catalyst contains molybdenum as partially decomposed ammonium heptamolybdate and cobalt as partial decomposed cobalt nitrate. Metal content of the final catalyst is 10 w % Mo and 3.5 w % Co.

EXAMPLE VI

In this experimental Example, the catalyst is prepared by impregnating to incipient wetness 40 parts of Carbon A of the Table supra (of American Norit) in the form of 0.8 mm extrudates with 29 parts of deionized water containing 5 parts of ammonium heptamolybdate.$4H_2O$ and 1.05 parts of potassium nitrate. After heating in air at 115° C. for 24 hours, this material is impregnated to incipient wetness with 26 parts of deionized water containing 9 parts of cobalt nitrate. $6H_2O$. The resulting material is heated in air at 115° C. for 24 hours. The final catalyst contains molybdenum as partially decomposed ammonium heptamolybdate, cobalt as partially decomposed cobalt nitrate, and potassium as partially decomposed potassium nitrate. Metal content in the final catalyst is 1 w % K, 6 w % Mo, and 4 w % Co.

EXAMPLES VII

In this example, the catalyst is prepared from 1.4 mm extrudates of carbon C of the Table surpa (of American Company Norit Company) which contains about 2 w % K as received. This material (75 parts) is impregnated to incipient wetness with 38 parts of deionized water containing 9.4 parts of ammonium heptamolybdate.$4H_2O$. After heating in air at 115° C. for 24 hours, this material is impregnated to incipient wetness with 36 parts of deionized water containing 8.5 parts of cobalt nitrate.$6H_2O$. The resulting material is heated in air at 115° C. for 24 hours. The final catalyst contains molybdenum as partially decomposed ammonium heptamolybdate, cobalt as partially decomposed cobalt nitrate, and potassium. Metal content in the final catalyst is 6 w % Mo, 2 w % Co, and approximately 2 w % K.

EXAMPLE VIII*

In this Control Example, the catalyst is prepared from 1.4 mm extrudates of Carbon C (of the Tablesupra of American Norit Company) which contains about 2 w % K as received. Prior to use, the Carbon C is water washed until the content of potassium K was decreased to below about 0.1 w %. This material (40 parts) is impregnated to incipient wetness with 24 parts of deionized water containing 5.3 parts of ammonium hexamolybdate.$4H_2O$. After heating in air at 115° C. for 24 hours, this material is impregnated to incipient wetness with 20 parts of deionized water containing 4.5 parts of cobalt nitrate.$6H_2O$. The resulting material is heated in air for 24 hours. The final catalyst contains molybdenum as partially decomposed ammonium heptamolybdate and cobalt as partially decomposed cobalt nitrate. Metal content in the final catalyst is 6 w % Mo, 2 w % Co, and less than 0.1 w % K.

Each catalyst is evaluated to determine its ability to effect hydrodesulfurization HDS and olefin hydrogenation HYD activity in a hydrotreating reactor. For each run, 25 cc of catalyst is loaded into a hydrotreating reactor which is 21 mm i.d. and 50 cm. long—equipped with thermocouples.

Oxygen is purged by passing helium through the reactor and the catalyst is then presulfided by passing through the reactor 250 cc/min of 10 v % hydrogen sulfide in hydrogen for 15 minutes at room temperature and 1 atmospheric pressure. The temperature of the bed is increased at 3° C./minute to 350° C. and maintained at that sulfiding temperature for 3 hours.

The temperature of the reactor is then lowered to reaction temperature with the sulfiding gas still flowing.

A back pressure of about 100 psig is applied to the reactor and flow of charge naphtha is initiated at the desired rate. When the liquid has passed through the catalyst bed, the flow of sulfiding gas is stopped, the flow of pure hydrogen gas is started at the desired rate, and the reactor pressure is increased to the desired point—this marking the beginning of the hydrotreating. Steady state is typically attained after 20-24 hours on stream.

The charge liquid naphthas were Typical Charge A supra for Examples IX*-XXII* and Typical Charge B supra for Examples XXIII-XXVI*. The Best Mode is believed to that of Example XXI.

Examples IX*-XXVI* were carried out at a total pressure at 400 psig. Hydrogen flow (SCFB) was 500 except for Example XVI, in which it was 450. Charge space velocity LHSV was 2.0 except for Example XVI, in which it was 3.0.

For each Example, the following were reported:
(i) %HDS—weight % of charge which has been hydrodesulfurized (by X-ray fluorescent XRF);
(ii) S—Sulfur content in the product in wppm (by XRF);
(iii) Olefins—Olefin content (vol %) in the product by Fluorescence Induced Adsorption (F1A);
(iv) V %—Volume % of original olefins hydrogenated;
(v) Octane No. Decrease—Change in octane number.

VI; n.b. Examples XIXXX) show hydrodesulfurization of cracked naphtha with decreased olefin saturation. Compare for example—control Example XVII* showing olefin saturation of 87.8% with Example XX showing only 56.9%

(iv) The catalysts of this invention show higher selectivity in that they saturate a much lower percentage of the olefins. Note for example Example XXI* showing only 26.0% saturation of olefins compared to the 80%–98% values of Examples IX*–XVIII*.

(v) The effect of the added poisons can be most readily noted by comparing control Examples XXV*-XXVI* (using carbon from which the potassium has been leached out by water washing) with e.g. Experimental Examples XXIII-XXIV utilizing the same carbon from which the potassium has not been leached out. Note that the % olefins saturated is only 27.4–33% in the experimental but 75.5–76.9% in the control.

(vi) The loss in octane number of the experimental Examples XIX-XXIV is only 2.2–7.5 while that of the control Examples is as high as 9.8.

Although this invention has been illustrated by reference to specific embodiments, it will be apparent to those skilled in the art that various changes and modifications may be made which clearly fall within the scope of the invention.

What is claimed:

1. The process for selectively hydrodesulfurizing a cracked naphtha, including light naphtha, full range naphtha and heavy naphtha, containing olefinic components and sulfur to minimize saturation of olefins which comprises:
maintaining a bed of sulfided carbon supported catalyst containing (1) 0.1-10 wt % of a metal of non-noble Group VIII, (ii) 0.5-30 wt % of a metal of Group VI-B and (iii) 0.01-15 wt % of one or more metals of Group IA, IIA, IIIB or a lanthanide wherein the carbon support is characterized by a surface area of 400-1800 m$^2$/g BET, a total pore volume of 0.4-1.2 cc/g, an average pore diameter of 8-50 Å, and an apparent bulk density of 300-600, passing hydrogen and cracked naphtha containing olefinic components and sulfur into contact with said catalyst bed;

TABLE

| Example | Catalyst Example | T °C. | % HDS | S (ppm) | V% Olefins | V % Olefins Hydrogenated | Octane No Decrease |
|---|---|---|---|---|---|---|---|
| IX* | I* | 300 | 95 | 57 | 2.2 | 93.5 | 9.4 |
| X* | II* | 330 | 84 | 187 | 5.2 | 85.6 | 8.6 |
| XI* | II* | 350 | 97 | 41 | 6.0 | 83.3 | 8.3 |
| XII* | III* | 285 | 95 | 66 | 0.7 | 98.0 | 9.8 |
| XIII* | III* | 275 | 93 | 85 | 1.0 | 97.1 | 9.7 |
| XIV* | III* | 265 | 83 | 204 | 3.7 | 89.0 | 8.9 |
| XV* | IV* | 330 | 94 | 76 | 6.5 | 81.9 | 8.2 |
| XVI* | IV* | 340 | 91 | 109 | 10.6 | 70.6 | 7.1 |
| XVII* | V* | 330 | 84 | 194 | 4.4 | 87.8 | 8.8 |
| XVIII | V* | 345 | 94 | 69 | 5.8 | 83.9 | 8.4 |
| XIX | VI | 318 | 94 | 68 | 8.8 | 74.9 | 7.5 |
| XX | VI | 298 | 85 | 175 | 15.1 | 56.9 | 5.7 |
| XXI | VII | 320 | 85 | 177 | 26.0 | 26.0 | 2.6 |
| XXII | VII | 350 | 86 | 163 | 24.7 | 29.4 | 2.9 |
| XXIII | VII | 320 | 77 | 331 | 19 | 33.3 | 2.7 |
| XXIV | VII | 350 | 76 | 341 | 20.7 | 27.4 | 2.2 |
| XXV* | VIII* | 310 | 92 | 110 | 6.8 | 75.5 | 6 |
| XXVI* | VIII* | 340 | 95 | 74 | 6.4 | 76.9 | 6.1 |

From the above Table, the following conclusions may be drawn;
(i) the conventional commercial hydrotreating catalyst (Examples I*-III*; n.b. Examples IX*-XVI*) controls undesirably saturate a major portion of the olefins present in the charge cracked naphtha—even at mild reaction conditions at which only about 84% HDS occurs;
(ii) The control carbon-supported catalyst, bearing molybdenum and either nickel or cobalt (Examples IV*-V* and VIII*; n.b. Examples XV*-XVIII* and XXV*-XXVI*) also undesirably saturate a major portion of the olefins presents under conditions required to produce >84% HDS.
(iii) The experimental carbon catalysts of this invention which have been doped or poisoned with the additives of this invention (such as K) (Example maintaining said cracked naphtha containing olefinic components and sulfur in contact with said catalyst bed at hydrodesulfurizing conditions, thereby effecting selective hydrodesulfurization of said cracked naphtha containing olefinic components and sulfur and forming a product stream of containing selectively desulfurized cracked naphtha and retaining a high olefin content of at least about 50% of the olefin content before desulfurization, and recovering said product stream of cracked naphtha containing a high olefin content.

2. The process for treating a cracked naphtha as claimed in claim 1 wherein said catalyst contains potassium as the Group IA metal.

3. The process for treating a cracked naphtha as claimed in claim 1 wherein said catalyst contains calcium as the Group II A metal.

4. The process for treating a cracked naphtha as claimed in claim 1 wherein said catalyst contains a Group IA metal and a Group II A metal.

5. The process for treating a cracked naphtha as claimed in claim 1 wherein said catalyst contains cobalt as the Group VIII metal.

6. The process for treating a cracked naphtha as claimed in claim 1 wherein said catalyst contains molybdenum as the Group VI-B metal.

7. The process for treating a cracked naphtha as claimed in claim 1 wherein said charge is a cracked naphtha from a catalytic cracking unit.

8. The process for treating a cracked naphtha as claimed in claim 1 wherein said charge is a cracked naphtha from a coking unit.

* * * * *